(12) United States Patent
Lefebvre

(10) Patent No.: US 11,408,340 B2
(45) Date of Patent: Aug. 9, 2022

(54) TWIN-ENGINE SYSTEM WITH ELECTRIC DRIVE

(71) Applicant: PRATT & WHITNEY CANADA CORP., Longueuil (CA)

(72) Inventor: Guy Lefebvre, St-Bruno-de-Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 160 days.

(21) Appl. No.: 16/875,470

(22) Filed: May 15, 2020

(65) Prior Publication Data

US 2021/0355870 A1    Nov. 18, 2021

(51) Int. Cl.
| | |
|---|---|
| *F02C 6/20* | (2006.01) |
| *B64D 35/08* | (2006.01) |
| *F02C 7/32* | (2006.01) |
| *B64D 27/02* | (2006.01) |
| *B60K 25/00* | (2006.01) |
| *B60K 6/26* | (2007.10) |

(52) U.S. Cl.
CPC ............... *F02C 6/20* (2013.01); *B64D 35/08* (2013.01); *F02C 7/32* (2013.01); *B60K 2006/266* (2013.01); *B60K 2025/005* (2013.01); *B64D 2027/026* (2013.01); *F05D 2220/329* (2013.01); *F05D 2220/70* (2013.01); *F05D 2220/76* (2013.01)

(58) Field of Classification Search
CPC ........ B64D 2027/026; B60K 2006/266; B60K 2025/005
See application file for complete search history.

(56) References Cited

U.S. PATENT DOCUMENTS

| | | | |
|---|---|---|---|
| 4,109,743 A | 8/1978 | Brusaglino et al. | |
| 4,554,989 A | 11/1985 | Gruich et al. | |
| 5,867,979 A | 2/1999 | Newton et al. | |
| 7,497,285 B1* | 3/2009 | Radev .................. | B60W 20/00 180/65.225 |
| 7,770,377 B2 | 8/2010 | Rolt | |
| 7,802,757 B2 | 9/2010 | Dooley et al. | |
| 7,854,582 B2 | 12/2010 | Ullyott | |
| 7,926,287 B2 | 4/2011 | Ullyott et al. | |
| 8,226,522 B2 | 7/2012 | Lemmers, Jr. | |
| 8,232,700 B2 | 7/2012 | Dooley | |
| 8,324,746 B2* | 12/2012 | Bradbrook ............... | F02C 7/32 290/1 A |
| 8,461,704 B2 | 6/2013 | McLoughlin et al. | |
| 9,601,970 B2 | 3/2017 | French et al. | |
| 10,371,007 B2 | 8/2019 | Cigal et al. | |
| 10,408,133 B2 | 9/2019 | Wintgens et al. | |
| 10,458,340 B2 | 10/2019 | Lefebvre | |
| 10,465,611 B2 | 11/2019 | Durocher et al. | |
| 10,533,559 B2 | 1/2020 | Plante et al. | |

(Continued)

*Primary Examiner* — Todd E Manahan
*Assistant Examiner* — Marc J Amar
(74) *Attorney, Agent, or Firm* — Norton Rose Fulbright Canada LLP.

(57) ABSTRACT

A twin-engine system includes a gas turbine engine comprising a core and a first output shaft drivable by the core. An electric engine has an electric motor configured to drive a second output shaft. A reduction gear box (RGB) has an RGB input drivingly engaged to both the first output shaft and the second output shaft. The RGB has an RGB output to provide rotational output to a rotatable load.

18 Claims, 4 Drawing Sheets

(56) References Cited

U.S. PATENT DOCUMENTS

| | | |
|---|---|---|
| 2010/0013223 A1 | 1/2010 | Certain |
| 2012/0025032 A1 | 2/2012 | Hopdjanian et al. |
| 2013/0098060 A1 | 4/2013 | Suciu et al. |
| 2013/0125561 A1* | 5/2013 | Schwarz .................. F02K 3/06 60/802 |
| 2014/0034781 A1* | 2/2014 | Kouros ................. B64D 27/24 244/60 |
| 2014/0140871 A1 | 5/2014 | Grieser |
| 2015/0260154 A1* | 9/2015 | Thomazios ............. F03D 13/10 416/124 |
| 2015/0315974 A1 | 11/2015 | Suciu et al. |
| 2017/0225573 A1 | 8/2017 | Waltner |
| 2017/0225794 A1* | 8/2017 | Waltner ................ B64D 35/08 |
| 2017/0282702 A1* | 10/2017 | Kim ....................... B60K 6/547 |
| 2017/0320584 A1 | 11/2017 | Menheere |
| 2017/0327238 A1* | 11/2017 | Roever .................. B64D 29/00 |
| 2017/0370284 A1 | 12/2017 | Harvey et al. |
| 2018/0135522 A1 | 5/2018 | Mitrovic et al. |
| 2018/0080378 A1 | 8/2018 | Forest et al. |
| 2018/0223740 A1 | 8/2018 | Forest et al. |
| 2018/0251226 A1 | 9/2018 | Fenny et al. |
| 2018/0304738 A1* | 10/2018 | Kuwahara .............. B60K 6/442 |
| 2019/0300186 A1* | 10/2019 | Lieven ................... F01D 15/10 |
| 2020/0049025 A1 | 2/2020 | Morgan et al. |
| 2021/0061451 A1* | 3/2021 | Gons ..................... B64D 31/00 |
| 2021/0179286 A1* | 6/2021 | Harvey ................. B64D 27/10 |
| 2021/0229542 A1* | 7/2021 | Lehmann ............... B60K 6/38 |
| 2021/0262359 A1* | 8/2021 | Sidelkovskiy ....... H02K 7/1823 |

\* cited by examiner

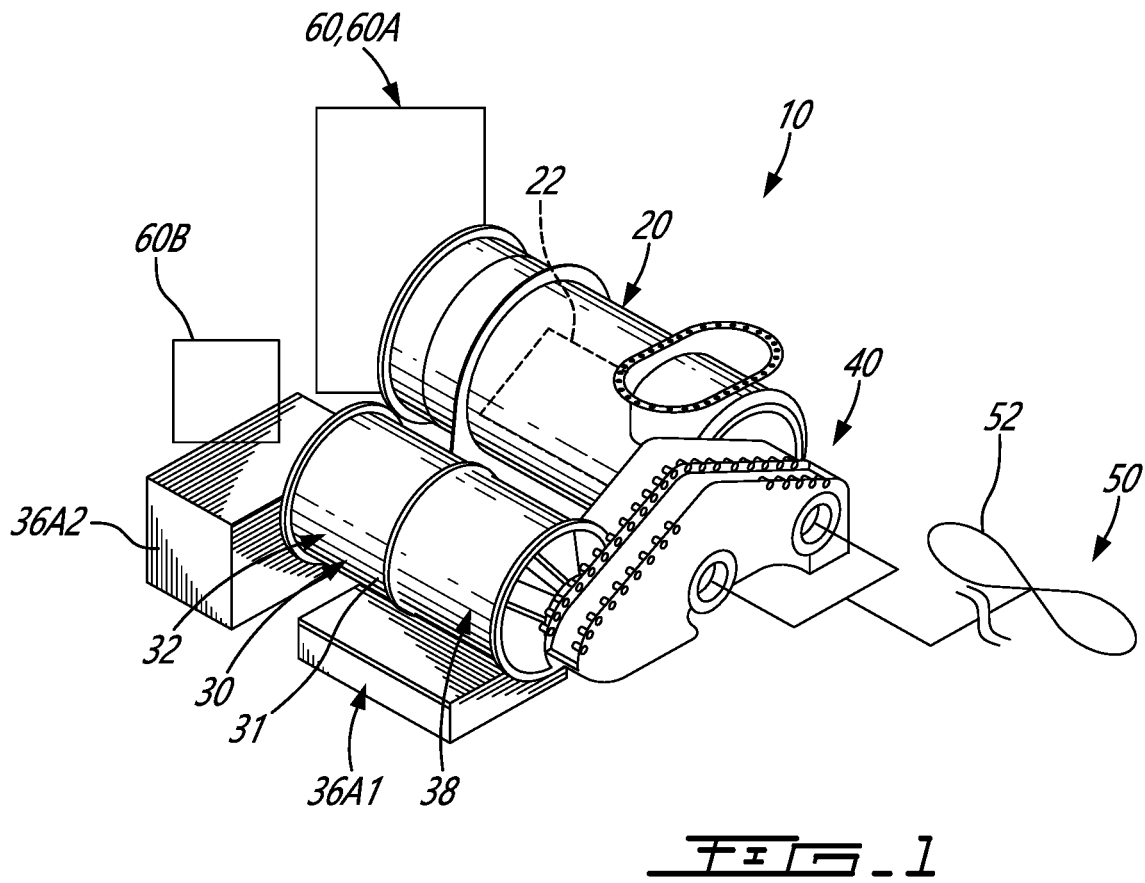
FIG_1
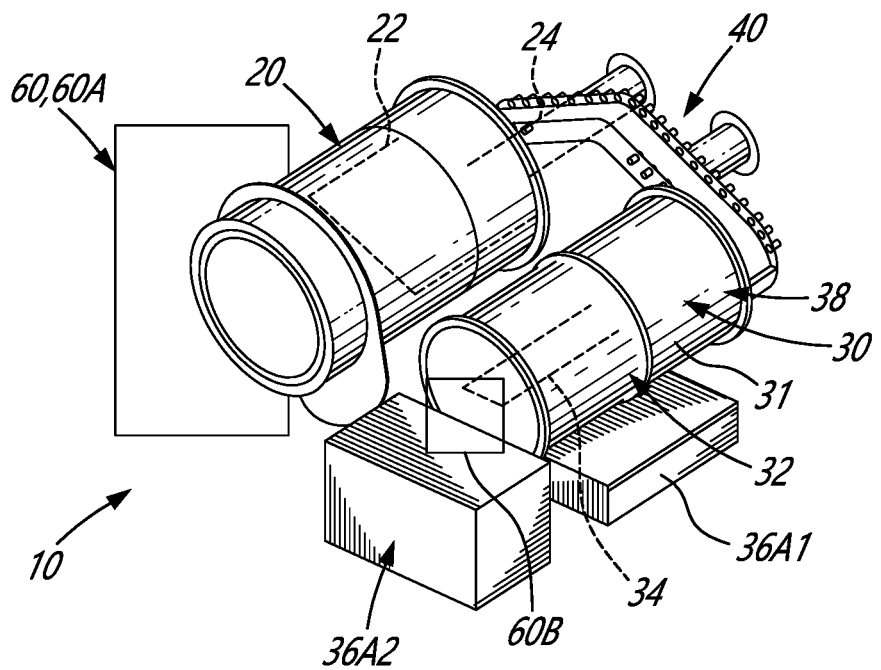
FIG_2

TWIN-ENGINE SYSTEM WITH ELECTRIC DRIVE

TECHNICAL FIELD

The application relates generally to multi-engine power plants and, more particularly, to a twin-engine power plant for rotary-wing aircraft.

BACKGROUND

Some rotary-wing aircraft, such as helicopters, are driven by multiple gas turbine engines. Twin-engine helicopters typically require both gas turbine engines to operate at a relatively high power output during some phases of flight such as during take-off, for example. During other phases of flight such as cruise, power requirements may be significantly lower and therefore the power output from each gas turbine engine may be significantly reduced. Even though only one of the two gas turbine engines may be required during such other phases, regulatory standards may require that both gas turbine engines remain operating at all times during flight.

When both gas turbine engines of a twin-engine helicopter are operating at reduced power output, they are typically not operating within an optimum performance window of the gas turbine engines. Consequently, depending on the type of mission, both gas turbine engines of the helicopter operating at a reduced power output setting may operate at a relatively low fuel efficiency (i.e. relatively high fuel consumption).

SUMMARY

There is disclosed a twin-engine system, comprising: a gas turbine engine comprising a core and a first output shaft drivable by the core; an electric engine having an electric motor configured to drive a second output shaft; and a reduction gear box (RGB) having an RGB input drivingly engaged to both the first output shaft and the second output shaft, the RGB having an RGB output to provide rotational output to a rotatable load.

There is disclosed a twin-engine system drivingly coupled to a rotary wing of an aircraft during flight of the aircraft, the twin-engine system comprising: a gas turbine engine comprising a core and a first output shaft drivable by the core; and an electric engine spaced apart from the gas turbine engine within the twin-engine system, the electric engine having an electric motor configured to drive a second output shaft; the first and second output shafts drivingly engaged to a common reduction gearbox (RGB) of the twin-engine system, the RGB configured to drive the rotary wing.

There is disclosed a method of operating a twin-engine system drivingly coupled to a rotatable load, the method comprising: operating a gas turbine engine to drive a first output shaft; operating an electric motor to drive a second output shaft; and driving the rotatable load via a common reduction gearbox (RGB) to which the first and second output shafts are drivingly engaged.

There is disclosed a method of modifying or upgrading an existing twin-engine system with two gas turbine engines drivingly engaged to a common RGB. The method includes replacing one of the gas turbine engines with an electric engine having an electric motor with a motor output shaft. The method also includes drivingly engaging the motor output shaft to the common RGB.

DESCRIPTION OF THE DRAWINGS

Reference is now made to the accompanying figures in which:

FIG. 1 is a perspective view of a twin-engine system;

FIG. 2 is another perspective view of the twin-engine system of FIG. 1;

DETAILED DESCRIPTION

Figure 3:
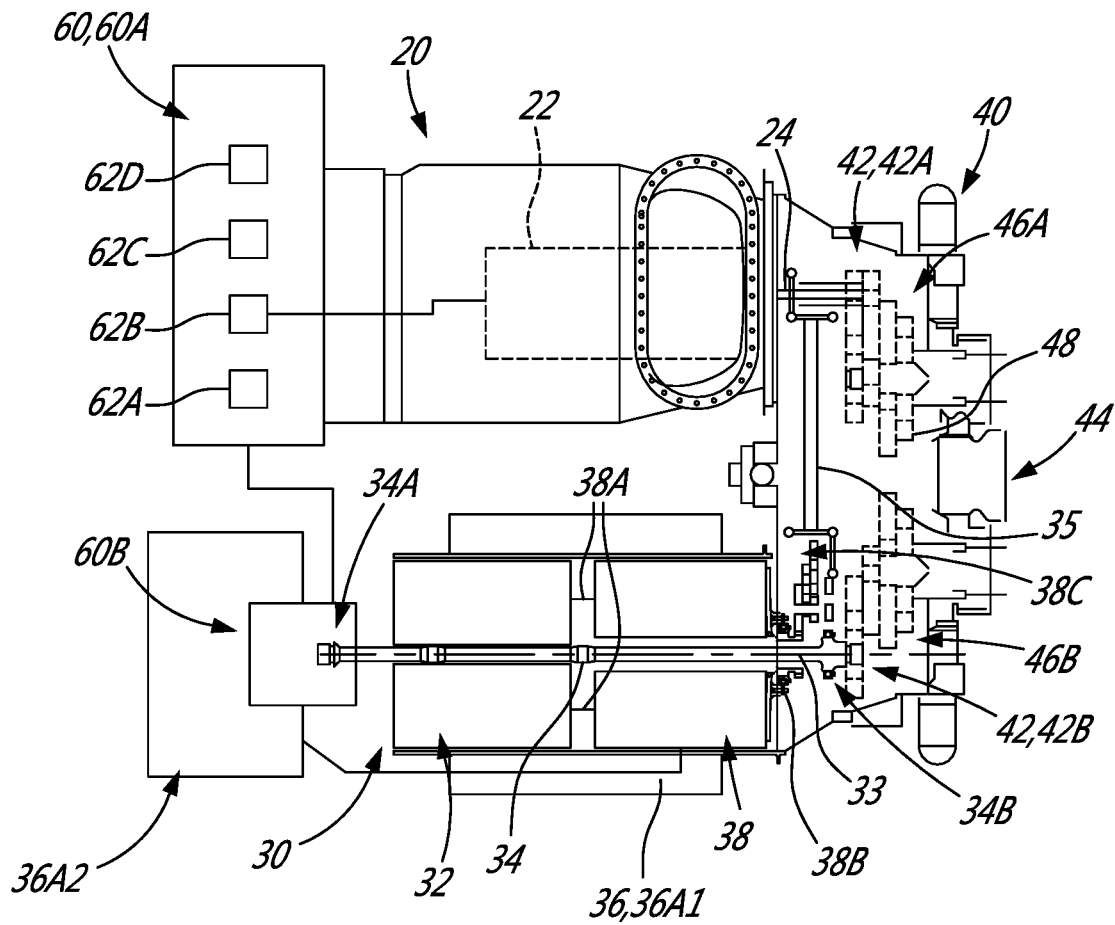
FIG. 3 is a top view of the twin-engine system of FIG. 1.

FIGS. 1 and 2 show an exemplary multiple engine system 10. The multi-engine system 10 in FIGS. 1 and 2 has two engines—a gas turbine engine 20 and an electric engine 30, and may therefore be referred to herein as a "twin-engine" system 10 or a "twin-pack". The gas turbine engine 20 and the electric engine 30 may be used as a power plant for an aircraft, including but not limited to a rotorcraft such as a helicopter which has a rotary wing 52. In the case of a helicopter application, the gas turbine engine 20 is a turboshaft engine. The engines 20,30 are positioned adjacent one another and may be enclosed by the same structure, such as an engine cowling of the aircraft. The twin-engine system 10 may be referred to as a "hybrid" propulsion system because its output is provided by the gas turbine engine 20 powered by the combustion of a hydrocarbon fuel, and by the electric engine 30 powered by an electrical power source. In FIGS. 1 and 2, the twin-engine system 10 has one gas turbine engine 20. In FIGS. 1 and 2, the twin-engine system 10 has only one gas turbine engine 20. In FIGS. 1 and 2, the twin-engine system 10 has a sole gas turbine engine 20.

Referring to FIGS. 1 and 2, the gas turbine engine 20 (sometimes referred to herein as "GTE 20") has a central core 22 through which gases flow and which includes most of the turbomachinery of the GTE 20. The GTE 20 is of a type preferably provided for use in subsonic flight, generally comprising in serial flow communication a compressor section for pressurizing ambient air, a combustor in which the compressed air is mixed with fuel and ignited for generating an annular stream of hot combustion gases, and a turbine section for extracting energy from the combustion gases. The core 22 may include one or more spools, where each spool rotates about a center axis of the GTE 20 to perform compression to pressurize the air, and to extract energy from the combustion gases before they exit the core 22. The core 22 may also have other components including, but not limited to, gearboxes, tower shafts, and bleed air outlets. The GTE 20 has an output shaft 24 (see FIGS. 2 and 3) that is driven by the turbine section of the core 22, and which is referred to herein as the first output shaft 24 of the twin-engine system 10. The first output shaft 24 extends from the core 22 and is drivingly engaged to a rotatable load 50, such as a rotor 52 of the helicopter, to drive the rotatable load 50, as described in greater detail below. In FIGS. 1 and 2, the first output shaft 24 is coaxial with the center axis of the GTE 20. During typical operation of the GTE 20, the turbomachinery of the core 22 of the GTE 20 in FIGS. 1 and 2 is driven exclusively by the combustion of a hydrocarbon fuel, and is not driven by an electrical power source. The GTE 20 in FIGS. 1 and 2 is the only gas turbine engine of the twin-engine system 10 configured to drive the rotatable load 50.

The electric engine 30 operates using electrical power to drive the rotatable load 50, either separately from the GTE 20 or concurrently therewith. The electric engine 30 in FIGS. 1 and 2 is the only electrical component of the twin-engine system 10 configured to drive the rotatable load 50. The electric engine 30 may be "built-in" into the twin-engine system 10, such that the electric engine 30 has all of its components assembled together to provide a single output to the rotatable load 50. For example, and as shown in FIGS. 1 and 2, the electric engine 30 and its components may be housed in an annular electric engine housing 31 which is mounted to suitable structure of the aircraft. The electric engine 30 may therefore be relatively easily inserted and mounted within the twin-engine system 10. Accordingly, the electric engine 30 and its physical integration within the twin-engine system 10 may, in some embodiments, allow for modifying an existing multiple-engine system 10 to be provided with the electric engine 30.

One of the electrical components of the electric engine 30 is an electric motor 32. The electric motor 32 includes, or is mechanically coupled to, a motor output shaft referred to herein as the second output shaft 34 (see FIGS. 2 and 3) of the twin-engine system 10. The second output shaft 34 is drivingly engaged to the rotatable load 50 to provide a rotational output to the rotatable load 50, as explained in greater detail below. The electric motor 32 is provided with an electrical input such as electrical power and generates a mechanical, rotational output with the second output shaft 34 to drive the rotatable load 50. In FIGS. 1 and 2, the electric motor 32 is provided only with an electrical input and is not also provided with a mechanical input. The second output shaft 34 is coupled indirectly to the rotatable load 50 and drives only the rotatable load 50.

Figure 6:
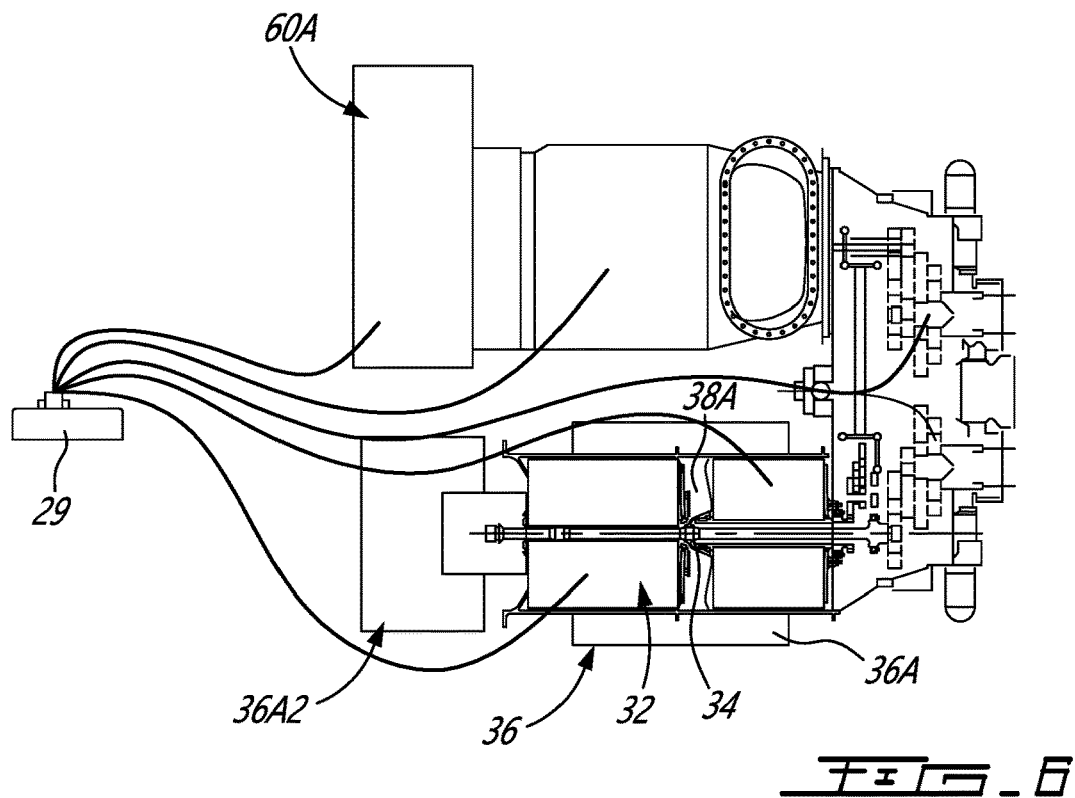
FIG. 6 is another top view of the twin-engine system of FIG. 1, showing wiring from a controller of the twin-engine system.

The electric motor 32 may have any suitable structure or component to achieve the functionality ascribed to it herein. The electric motor 32 may be selected to be sufficiently powerful to drive the rotatable load 50 either alone during some phases of flight without using the GTE 20, or with using a reduced amount of fuel by the GTE 20 during at least one phase of flight. Referring to FIG. 6, electricity for driving electric motor 32 may be supplied by an electric power source 36 under the control of a suitable controller 29 such as an EEC (Electronic Engine Controller) or FADEC (Full Authority Digital Engine Control). The electric power source 36 may, for example, include one or more batteries 36A. The controller 29 may be configured to control the operation of the electric motor 32 by providing suitable control signals to the electric motor 32 and/or providing suitable conditioning of the electric power supplied to the electric motor 32 by the electric power source 36. The controller 29 may actuate the amount of electric power supplied to the electric motor 32 in response to control signals it receives, such as for example, commands sent via a control interface (e.g., panel) from a pilot of an aircraft to which twin-engine system 10 is mounted. The controller 29 and the electric power source 36 may be configured to supply enough electric power to the electric motor 32 in order to produce some or all of the torque required to rotate the rotatable load 50 during at least one phase of flight of the aircraft.

The electric motor 32 may comprise one or more rotors and one or more respective stators. In some embodiments, the plurality of rotor/stator pairs may be angularly or circumferentially distributed about a shaft axis of rotation. One or more of rotors may have a respective rotor axis of rotation that is radially offset from a center axis of the electric motor 32. In some embodiments, each rotor axis may be radially offset from the center axis at a substantially uniform offset distance. Each rotor may be drivingly engaged (e.g., coupled via a shaft) to a respective drive gear for transferring motive power from the rotors to the second output shaft 34. The electric motor 32 may be drivingly engaged to transmit motive power to the second output shaft 34 in any suitable manner. In some embodiments, the electric motor 32 may be drivingly engaged to the second output shaft 34 via the drive gears drivingly engaged to a common gear. The structure and principle of operation of possible configurations for the electric motor 32 are described in U.S. Pat. No. 8,232,700 and in U.S. patent application 2017/0320584 A1, both of which are assigned to Pratt & Whitney Canada Corp., and the entirety of each of which is incorporated by reference herein.

Referring to FIGS. 1 and 2, the electric engine 30 is spaced apart from the GTE 20 within the enclosure (e.g. cowling, duct, nacelle, etc.) housing the twin-engine system 10. The expression "spaced apart" used herein refers to the fact that the electric engine 20 and the GTE 20 do not occupy the same volume, or occupy overlapping volumes, within the enclosure housing the twin-engine system 10. For example, in the configuration shown in FIGS. 1 and 2, the engines 20,30 have a substantially horizontal orientation, such that their longitudinal center axes also have a substantially horizontal orientation. By "substantially horizontal orientation", it is understood that the orientation may be within a few degrees of a purely horizontal plane. By "substantially horizontal orientation", it is understood that the orientation of the engines 20,30 has a vector along the horizontal axis whose magnitude greatly exceeds the magnitude of the vector along the vertical axis. In such a configuration, the electric engine 30 (and its center axis) is spaced laterally apart from (i.e. to the side of) the GTE 20 (and its center axis) within the enclosure housing the twin-engine system 10. In such a configuration, the first output shaft 24 and its shaft axis are spaced laterally apart from the second output shaft and its shaft axis. The direction of lateral spacing is parallel to the horizontal plane. Other configurations and orientations for the engines 20,30 are possible. For example, in one such alternate configuration, the engines 20,30 are stacked one on top of the other such that their output shafts 24,34 and center axis are vertically spaced apart.

Although the engines 20,30 may operate to concurrently drive the rotatable load 50, they are separate and distinct from one another. This separateness or distinctiveness may take different forms. For example, in FIGS. 1 and 2, the internal components of each engine 20,30 are housed in separate enclosures which do not occupy the same volume within the enclosure housing the twin-engine system 10. In another example, and referring to FIGS. 1 and 2, each engine 20,30 is supplied with its own source of power to drive its internal components. In yet another example, and referring to FIGS. 1 and 2, each engine 20,30 may operate independently of the other to provide their own output (e.g. first and second output shafts 24,34) to drive the rotatable load 50. In yet another example, and referring to FIGS. 1 and 2, the internal rotating components of each engine 20,30 rotate about their own, separate axes. In yet another example, and referring to FIGS. 1 and 2, the distinctiveness of the engines 20,30 is embodied in part by the first and second output shafts 24,34, which rotate about separate, parallel and spaced-apart axes, which may rotate at different rotational speeds, and which may have different diameters.

Referring to FIGS. 1 and 2, the twin-engine system 10 includes a reduction gearbox 40 (sometimes referred to herein as "RGB 40"). The RGB 40 processes and outputs the rotational drive transferred thereto from the GTE 20 and from the electric engine 30 via their respective first and second output shafts 24,34 through known speed-changing (e.g. reducing) techniques. The RGB 40 allows for the rotatable load 50 to be driven at its optimal rotational speed, which may be different from the rotational speed of the first and/or second output shafts 24,34. Referring to FIG. 3, the RGB 40 has one or more RGB inputs 42 drivingly engaged to both the first output shaft 24 and to the second output shaft 34, to receive mechanical energy from one or both of the first and second output shafts 24,34 of the respective engines 20,30. The RGB 40 is configured to direct at least some of the inputted mechanical energy from the engines 20,30 toward one or more RGB outputs 44 for driving the rotatable load 50 at a suitable operating (e.g., rotational) speed. The RGB inputs and outputs 42,44 are any suitable mechanical components (gearing, splines, shafts, etc.) which allow for the transfer or receipt of rotational motion. The RGB 40 may be configured to permit the rotatable load 50 to be driven by either the GTE 20 or the electric engine 30, or by both the GTE 20 and the electric engine 30 together.

Referring to FIG. 3, the RGB 40 is drivingly engaged to the core 22 of the GTE 20 to be driven by the first output shaft 24. In FIG. 3, the RGB input 42 is mechanically coupled to one end of the first output shaft 24, which extends between the RGB input 42 and the core 22. The first output shaft 24 of the core 22 is thus drivingly connected to the rotatable load 50 via the RGB 40. Similarly, the RGB input 42 is also drivingly engaged to the electric engine 30 to be driven by the second output shaft 34. In FIG. 3, the RGB input 42 is mechanically coupled to one end of the second output shaft 34, which extends between the RGB input 42 and the electric motor 32. The second output shaft 34 of the electric engine 30 is thus drivingly connected to the rotatable load 50 via the RGB 40.

The RGB input 42 is thus drivingly engaged to both the first output shaft 24 and to the second output shaft 34. The RGB 40 may therefore be considered a "twin pack" RGB because it is configured to receive rotational input from two different engines 20,30. The twin-engine system 10 thus has a single RGB 40 that is common to both of the engines 20,30. Both the GTE 20 and the electric engine 30 are drivingly connected to the same RGB 40 transmission for various applications, such as helicopters. The twin-engine system 10 thus defines a hybrid engine architecture composed of two distinct engines 20,30 (i.e. a twin-pack), one electric and one gas turbine, which each have output shafts 24,34 connected to a common RGB 40.

Referring to FIG. 6, control of the twin-engine system 10 is effected by one or more controller(s) 29, which may be Full Authority Digital Engine Control(s) ("FADEC(s)"), electronic engine controller(s) (EEC(s)), or the like, that are programmed to manage, as described herein below, the operation of the engines 20,30 to reduce an overall fuel burn, particularly during sustained cruise operating regimes, wherein the aircraft is operated at a sustained (steady-state) cruising speed and altitude. Other phases of a typical helicopter mission would include transient phases like take-off, climb, stationary flight (hovering), approach and landing. Cruise may occur at higher altitudes and higher speeds, or at lower altitudes and speeds, such as during a search phase of a search-and-rescue mission.

In the present description, while the aircraft conditions (cruise speed and altitude) are substantially stable, the engines 20,30 of the twin-engine system 10 may be operated asymmetrically, with one engine 20,30 operated in a high-power "active" mode and the other engine 20,30 operated in a lower-power (which could be no power, in some cases) "standby" mode. Doing so may provide fuel saving opportunities to the aircraft, however there may be other suitable reasons why the engines 20,30 are desired to be operated asymmetrically. This operation management may therefore be referred to as an "asymmetric mode" or an "asymmetric operating regime", wherein one of the two engines 20,30 is operated in a lower power (which could be no power, in some cases) "standby mode" while the other engine is operated in a high-power "active" mode. The twin-engine system 10 may be used in an aircraft, such as a helicopter, but also has applications in suitable marine and/or industrial applications or other ground operations.

In various embodiments, systems and methods disclosed herein, the GTE 20 of the twin-engine system 10 drivingly coupled to a main rotor 52 of the helicopter may be allowed to reduce its output power level after takeoff and/or during a cruise phase of flight of the helicopter in order to reduce overall fuel consumption when power from the electric engine 30 is sufficient to drive the main rotor 52. For example, instead of having both engines 20,30 of the twin-engine system 10 operating at lower output power levels, it may be more fuel efficient to operate the electric engine 30 at a higher output power level while the GTE 20 is idling. Another example of beneficial asymmetrical operation of the engines 20,30 may occur during ground operation or taxiing of the helicopter, during which it may be more fuel efficient to operate the electric engine 30 only, or at a higher output power level, while the GTE 20 is allowed to idle. The use of the electric engine 30 operating in combination with the GTE 20 in the twin-engine system 10 may allow for reducing the manufacturing cost of the twin-engine system 10, when compared a convention twin-pack having two gas turbine engines, it being understood that gas turbine engines are typically the costliest components of the twin-pack. The use of the electric engine 30 operating in combination with the GTE 20 in the twin-engine system 10 may allow for reduced operating costs in the form of reduced fuel consumption for the twin-engine system 10, since the electric engine 30 may allow for optimizing operation of the twin-engine system 10 through all phases of flight. The use of the electric engine 30 operating in combination with the GTE 20 in the twin-engine system 10 may allow for other cost savings, in the form of lower acquisition costs for the engines 2,030, lower operating cost, and lower long term costs because of possible reductions in engine servicing.

Referring to FIG. 3, another one of the electrical components of the electric engine 30 is an electric generator 38. During operation, the electric generator 38 converts a mechanical output into electrical power that is supplied to the electric motor 32. The electric generator 38 is configured to provide electrical power to the electric motor 32. In FIG. 3, the electric generator 38 is a separate component from the electric motor 32. One possible configuration of this separateness may include the electric generator 38 and the electric motor 32 being enclosed in separate containers with wiring 38A extending between them to supply electrical power to the electric motor 32. In FIG. 3, the electric generator 38 during operation supplies electrical power only to the electric motor 32. In FIG. 3, the wiring 38A extends only between the electric generator 38 and the electric motor 32 to supply electrical power to the electric motor 32. Additional wiring from the controller 29 to the electric motor 32 and to the electric generator 38 may be routed outside the structure of the engines 20,30 (see, e.g., FIGS. 6 and 7). The twin-engine system 10 disclosed herein may therefore have a cooperating electric motor 32 and electric generator 38 disposed adjacent to the RGB 40. In an alternate embodiment of the twin-engine system 10, there is no electric generator 38, and the electric motor 32 is supplied with electrical power from another electrical power source 36, such as the batteries 36A. The electric generator 38 may be located elsewhere in the engine 10 in alternate configurations. The electric generator 38 may be connected to the batteries 36A. The controller 29 may provide full digital envelope protection, to optimize hybrid operation of the twin-engine system 10 through all phases of flight. The controller 29 may be configured to control the operation of the electric motor 32 by optimizing the hybrid engine functionality either via the batteries 36A or directly from the electric generator 38.

Referring to FIG. 3, the electric generator 38 is aligned with the electric motor 32 within the twin-engine system 10. The electric generator 38 and the electric motor 32 have the same orientation within the twin-engine system 10. Both the electric motor 32 and the electric generator 38 are mounted about the center axis 33 of the electric engine 30. Both the electric motor 32 and the electric generator 38 are mounted along the axis of the second output shaft 34. The electric motor 32 and the electric generator 38 are disposed axially adjacent one another, and next to the RGB 40. In FIG. 3, the electric generator 38 is disposed axially between the RGB 40 and the electric motor 32. In an alternate configuration, the electric motor 32 is disposed axially between the RGB 40 and the electric generator 38. In FIG. 3, the electric motor 32 and the electric generator 38 are disposed in series or sequentially along the center axis 33 of the electric engine 30.

Figure 5:
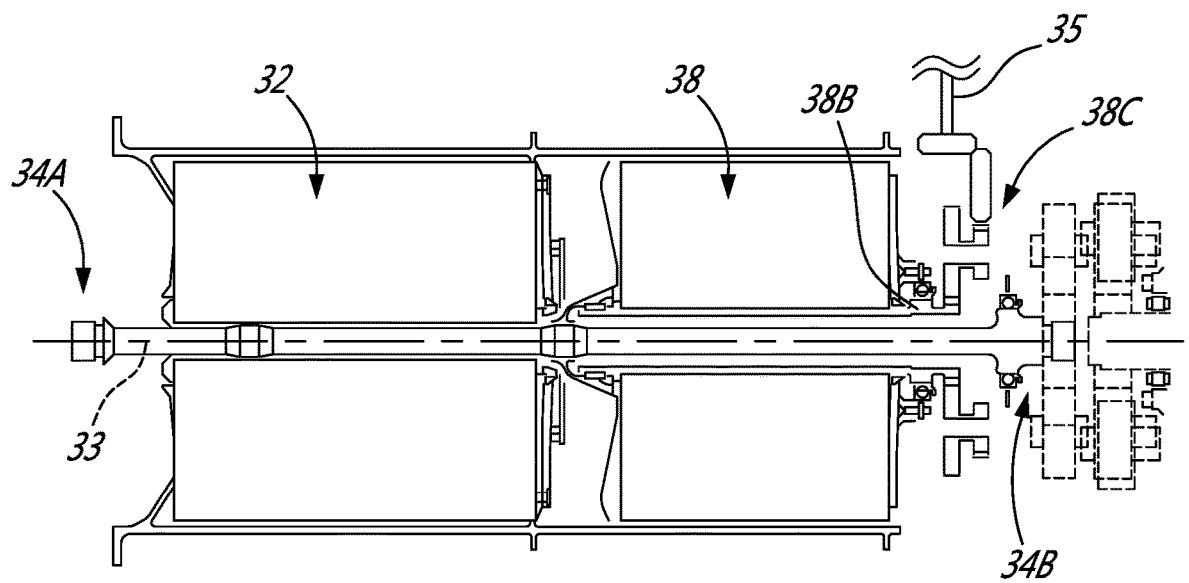
FIG. 5 is a top view of an electric engine of the twin-engine system of FIG. 1.

Referring to FIG. 3, the second output shaft 34 of the electric motor 32 extends through the electric generator 38. In FIG. 3, the electric generator 38 and the electric motor 32 are installed in series, such that the second output shaft 34 passes through a center shaft 38B of the electric generator 38. In an alternate configuration, the center shaft 38B of the electric generator 38 passes through the second output shaft 34 of the electric motor 32. Referring to FIG. 3, the electric generator 38 is drivingly engaged to the GTE 20 to be driven thereby. The electric generator 38 is itself driven by the GTE 20 in order to convert a mechanical output from the GTE 20 into electrical power that is supplied to the electric motor 32. The twin-engine system 10 may thus be a hybrid engine architecture combining the GTE 20 with the electric engine 30, where the electric motor 32 is powered by the electric generator 38 which is itself driven by the GTE 20. Different arrangements are possible to achieve this functionality. For example, and referring to FIGS. 3 and 5, the center shaft 38B is meshed with a gear train 38C near the electric generator 38. The gear train 38C is drivingly engaged to a transfer shaft 35 engaged, directly or indirectly, to the first output shaft 24 which is driven by the core 22 of the GTE 20. In another possible configuration, the electric generator 38 is drivingly engaged with another rotatable component to receive a mechanical input therefrom, such as a gear from the gearbox of the main rotor of the helicopter.

Figure 4:
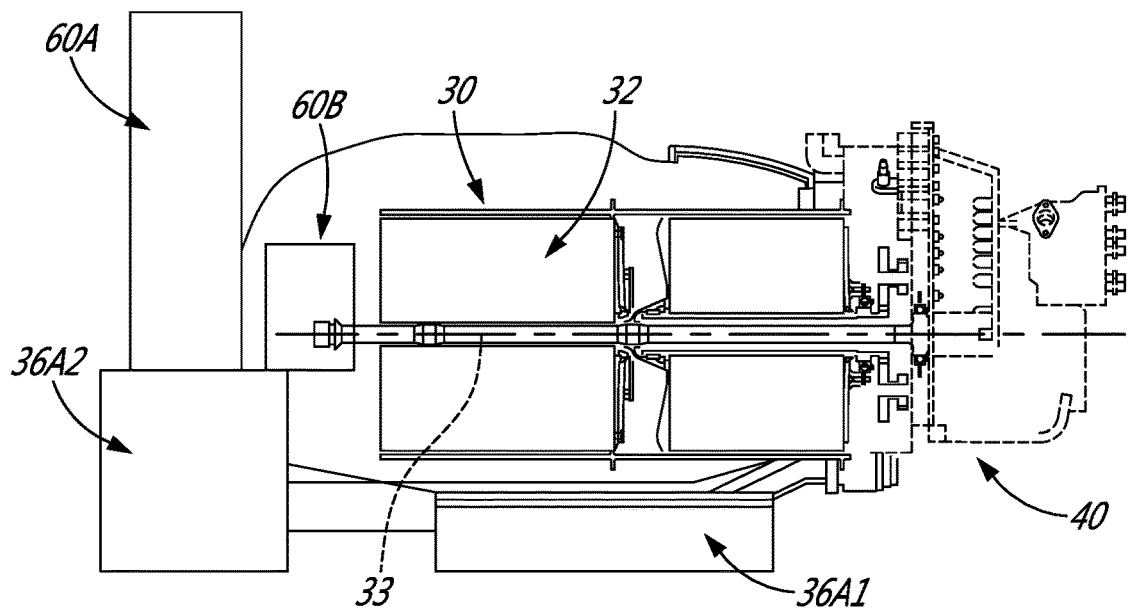
FIG. 4 is a side elevational view of the twin-engine system of FIG. 1.

Referring to FIG. 3, the twin-engine system 10 includes a first battery 36A1 and a second battery 36A2. The first and second batteries 36A1,36A2 are units, cells, packs, or power packs that constitute some or all of the electrical power source 36. The first battery 36A1 during operation provides electrical power to the electric motor 32 so that it can output a rotational drive with the second output shaft 34. The first battery 36A1 thus contributes to the functionality of the hybrid twin-engine system 10 during normal operation thereof. The second battery 36A2 during operation provides electrical power as a substitute to the GTE 20, in order to drive the first output shaft 24 in the event that the core 22 of GTE 20 cannot drive the first output shaft 24. The second battery 36A2 is thus a safety or redundancy battery unit which is not typically used during normal operation of the twin-engine system 10, and is instead used primarily as a backup in an aircraft landing situation, for example, in case of inoperability of the GTE 20. Referring to FIGS. 3 and 4, the first and second batteries 36A1,36A2 are spaced apart from each other along the center axis 33 of the electric engine 30. The first battery 36A1 is placed axially between the RGB 40 and the second battery 36A2. The first battery 36A1 is positioned underneath the electric engine 30 and the second battery 36A2 is positioned at an end of the electric engine 30, and at an end of the electric motor 32. The electric generator 38 may supply the first and/or second batteries 36A1,36A2 with electrical power.

Referring to FIG. 3, the RGB input 42 receives the rotational drive from the first and second output shafts 24,34 at two different locations of the RGB 40. The RGB input 42 includes a first input 42A drivingly engaged to the first output shaft 24, and a second input 42B drivingly engaged to the second output shaft 34. The first and second inputs 42A,42B are any suitable mechanical components (gearing, splines, shafts, etc.) which allow for the receipt of rotational motion from the first and second output shafts 24,34. The first and second inputs 42A,42B are spaced apart from each other. By "spaced apart", it is understood that the first and second inputs 42A,42B do not occupy the same location on the RGB 40. One possible spaced-apart configuration of the first and second inputs 42A,42B is shown in FIG. 3, where the engines 20,30 have a substantially horizontal orientation. In such a configuration, the first input 42A (and its center axis) is spaced laterally apart from (i.e. to the side of) the second input 42B (and its center axis) within the periphery or body of the RGB 40. In FIG. 3, the first and second inputs 42A,42B are shown as gears or gearings which are laterally spaced apart from each other, which rotate independently of one another, and which mesh with gearing driving the common RGB output 44. Other spaced-apart configurations of the first and second inputs 42A,42B are possible. In the configuration of the twin-engine system 10 shown in FIG. 3, the GTE 20 is drivingly connected to one "side" or portion of the RGB 40, and the electric engine 30 (i.e. the electric motor 32 and the electric generator 38) are drivingly connected on the other "side" or another portion of the RGB 40.

FIG. 3 shows one possible arrangement of components which allows for the GTE 20 and the electric engine 30 to drive the rotatable load 50 either concurrently or individually. The RGB 40 has a first gear train 46A drivingly engaging the first output shaft 24 to the RGB output 44, and a second gear train 46B drivingly engaging the second output shaft 34 to the RGB output 44. In FIG. 3, the first and second gear trains 46A,46B are separate from each other (rotate independently) and are spaced apart from each other. The first gear train 46A has a first gear ratio and the second gear train 46B has a second gear ratio different from the first gear ratio. The different first and second gear ratios allow for the first and second gear trains 46A,46B to have different gear speeds and torque ratios. In an alternate embodiment, the first and second gear trains 46A,46B have the same gear ratio, and any further reduction may be performed by other gearing of the RGB 40. Referring to FIG. 3, the RGB 40 has a clutch 48, or other mechanism for connecting and disconnecting components, engaged with the first and second gear trains 46A,46B and with the RGB output 44. The clutch 48 allows for the first and second gear trains 46A,46B, and thus for the GTE 20 and the electric engine 30, to engage the RGB output 44 individually or concurrently. In an alternate embodiment of the RGB 40, there are no separate first and second gear trains 46A,46B. Instead, in such a configuration, the first and second output shafts 24,43 drive a common RGB input 42 which, through a single internal gearing, transfers the drive to the RGB output 44. Other arrangements of the RGB 40 which allow for the GTE 20 and the electric engine 30 to drive the rotatable load 50 are possible.

Referring to FIG. 3, the twin-engine system 10 includes an accessory gearbox 60, sometimes referred to herein as "AGB 60". The AGB 60 receives a rotational output and in turn drives accessories 62 that contribute to the functionality of the twin-engine system 10. In FIG. 3, the AGB 60 has the following accessories 62: a fuel pump 62A, an engine starter 62B, a permanent magnet alternator (PMA) 62C, and an oil pump 62D. It will be appreciated that the AGB 60 may include other accessories 62 as well, and that the position of the accessories can be different from that shown. During operation of the twin-engine system 10, a rotational drive is transmitted to the AGB 60 to thereby drive the accessories 62 drivingly engaged to the outputs (e.g. gears, shafts, etc.) of the AGB 60.

Referring to FIG. 3, the AGB 60 includes a primary AGB 60A having the accessories 62 and drivingly connected to the GTE 20 so that a rotational output from the GTE 20 is used to drive one or more of the accessories 62. The AGB 60 also has a secondary or back-up AGB 60B drivingly connected to the electric engine 30 and to the primary AGB 60A. The back-up AGB 60B is driven by a rotational output from the electric engine 30 in order to drive one or more of the accessories 62 of the primary AGB 60A, in the event that a mechanical drive from the GTE 20 is unavailable, or in the event that the GTE 20 is inoperable. The back-up AGB 60B is positioned at one end of the electric engine 30 and the RGB 40 is positioned at another end of the electric engine 30. The electric engine 30 is therefore axially disposed between the back-up AGB 60B and the RGB 40. The electric motor 32 and the electric generator 38 are positioned axially between the back-up AGB 60B and the RGB 40. The second output shaft 34 of the electric engine 30 has an AGB end 34A that is drivingly connected to an input of the back-up AGB 60B so that the electric motor 32 can provide a rotational input to the back-up AGB 60B. The second output shaft 34 has an RGB end 34B which is disposed on the opposite side of the second output shaft 34 as the AGB end 34A. The RGB end 34B is drivingly connected to the RGB input 42 of the RGB 40. Thus the electric engine 30 may have both extremities of its second output shaft 34 engaged to different gearboxes. The driving engagement of the electric motor 32 with the back-up AGB 60B may be formed for redundancy purposes, as a back-up in the event that the GTE 20 is unable to provide rotational drive to the accessories 62 of primary AGB 60A. The primary and back-up AGBs 60A,60B are shown in FIG. 3 as separate gearboxes. In an alternate configuration of the AGB 60, the primary and back-up AGBs 60A,60B are provided in the same housing and are defined by different but interconnected gear trains.

Referring to FIG. 3, the engine starter 62B is a separate component from the electric motor 32 and the electric generator 38 described above. The engine starter 62B is a spaced apart from the electric motor 32 and the electric generator 38, and is housed in a separate enclosure. The engine starter 62B may be configured as, or includes, an electric starter/generator drivingly engaged to a drive shaft of the core 22 of the GTE 20, to start rotation of the rotatable components of the core 22, such as the compressor section. For example, the second battery 36A2 described above may provide back-up electrical power as a substitute to the GTE 20, in order to drive the first output shaft 24 via the starter/generator. In certain engine operating conditions, the drive shaft of the core 22 of the GTE 20 may provide rotational drive to the starter/generator 62B to generate electrical power for various functions unrelated to the operation of the electric engine 30. This functionality of the engine starter 62B is thus separate from that of the electric motor 32 which is used to provide rotational drive only to the RGB 40 via the second output shaft 34. Furthermore, although the electric generator 38 may also be driven by the GTE 20, the electrical power thus generated by the electric generator 38 is supplied only to the electric motor 32.

Figure 7:
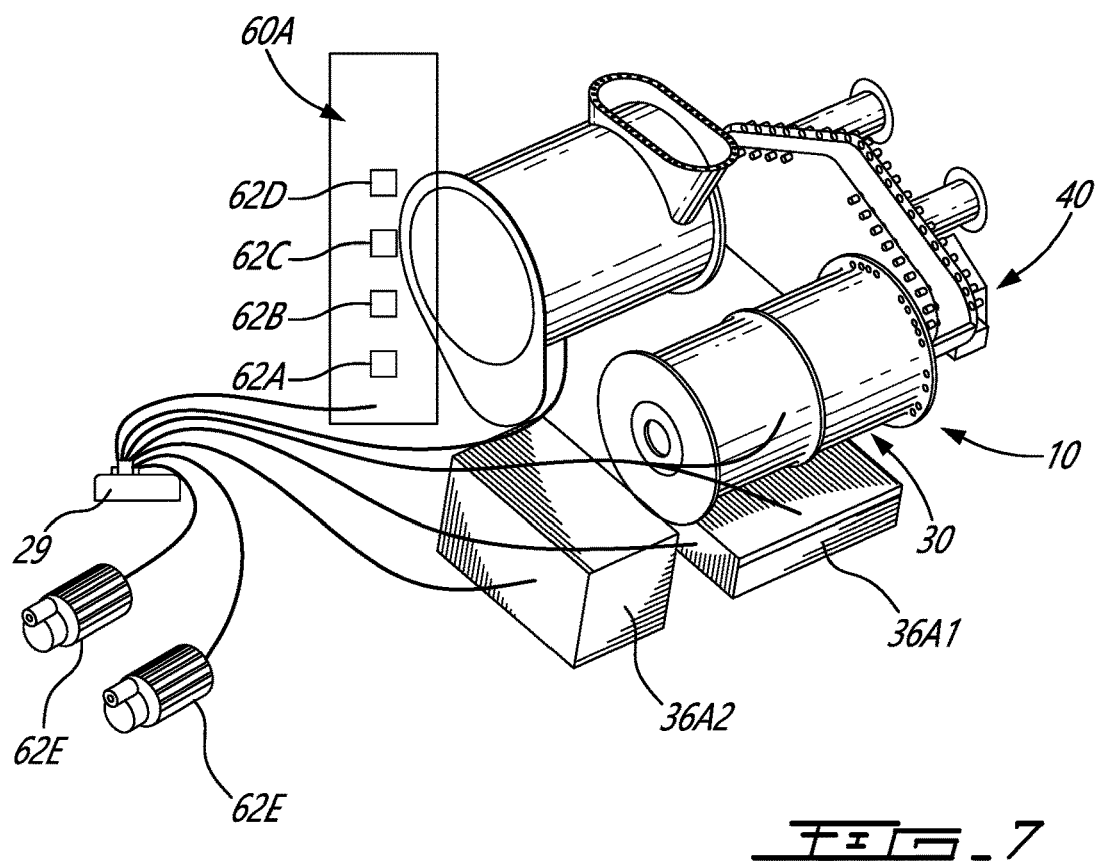
FIG. 7 is a perspective view of the twin-engine system of FIG. 1, showing wiring from a controller of the twin-engine system and other electric components.

In an alternate embodiment, an example of which is shown in FIG. 7, the twin-engine system 10 is free of a back-up AGB 60B such as the one shown in FIG. 3. In this configuration of the twin-engine system 10, the electric engine 30 and its second output shaft 34 are drivingly connected to the RGB 40 at the RGB end 34B and is free of any mechanical connection to the accessories 62 of the primary AGB 60A. In this configuration, separate electric motors 62E are used to provide back-up power to the accessories 62 of the primary AGB 60A.

Referring to FIG. 3, there is disclosed a method of operating the twin-engine system 10 drivingly coupled to the rotatable load 50. The method includes operating the GTE 20 to drive the first output shaft 24. The method includes operating the electric motor 32 to drive the second output shaft 34. The method includes driving the rotatable load 50 via the common RGB 40 to which the first and second output shafts 24,34 are drivingly engaged.

Referring to FIG. 1, there is disclosed a method of modifying or upgrading an existing twin-engine system 10 with two GTEs 20 drivingly engaged to a common RGB 40. The method includes replacing one of the GTEs 20 with an electric engine 30 having an electric motor 32 with a motor output shaft 34. This may include removing the GTE 20 to be replaced before substituting the electric engine 30. Replacing one of the GTEs 20 may include replacing one of the GTEs 20 with the electric engine 30 while leaving the other GTE 20 drivingly engaged to the common RGB 40. Alternatively, both GTEs 20 may be removed before one of them, or another GTE 20 entirely, is drivingly engaged to the common RGB 40 and put back into position next to the newly-installed electric engine 30. The method also includes drivingly engaging the motor output shaft 34 to the common RGB 40. The method may include providing the twin-engine system 10 with a first battery 36A1 configured to provide electrical power to the electric motor 32, and with a second battery 36A2 configured to provide electrical power as a substitute to the remaining gas turbine engine 20. The method may include drivingly engaging the AGB 60 to the electric engine 30, and positioning the electric engine 30 between the AGB 60 and the RGB 40. This method may allow for modifying or upgrading an existing twin-engine in the after-market or future market, for example to improve its performance by adding the electric engine 30 in the desired location. This may transform the existing engine into a hybrid electric-fuel twin-engine system 10.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A twin-engine system, comprising:
   a gas turbine engine comprising a core and a first output shaft drivable by the core;
   an electric engine having an electric motor configured to drive a second output shaft;
   a reduction gearbox (RGB) having an RGB input drivingly engaged to both the first output shaft and the second output shaft, the RGB having an RGB output to provide rotational output to a rotatable load; and
   an accessory gearbox (AGB) drivingly connected to the electric engine, at least part of the AGB positioned at one end of the electric engine and the RGB positioned at another end of the electric engine.

2. The twin-engine system of claim 1, wherein the RGB input includes a first input drivingly engaged to the first output shaft, and a second input spaced apart from the first input and drivingly engaged to the second output shaft.

3. The twin-engine system of claim 1, wherein the electric engine includes an electric generator configured to provide electrical power to the electric motor, the electric generator aligned with the electric motor within the twin-engine system.

4. The twin-engine system of claim 3, wherein the second output shaft of the electric motor extends through the electric generator.

5. The twin-engine system of claim 3, wherein the electric generator is drivingly engaged to the gas turbine engine.

6. The twin-engine system of claim 1, comprising a first battery configured to provide electrical power to the electric motor, and a second battery configured to provide electrical power as a substitute to the gas turbine engine.

7. The twin-engine system of claim 1, wherein the RGB has a first gear train drivingly engaging the first output shaft to the RGB output, and a second gear train drivingly engaging the second output shaft to the RGB output.

8. The twin-engine system of claim 7, wherein the first gear train has a first gear ratio and the second gear train has a second gear ratio different from the first gear ratio.

9. The twin-engine system of claim 1, wherein the gas turbine engine and the electric engine have a substantially horizontal orientation, the first output shaft spaced laterally apart from the second output shaft.

10. A twin-engine system drivingly coupled to a rotary wing of an aircraft during flight of the aircraft, the twin-engine system comprising:
    a gas turbine engine comprising a core and a first output shaft drivable by the core; and
    an electric engine spaced apart from the gas turbine engine within the twin-engine system, the electric engine having an electric motor configured to drive a second output shaft;
    the first and second output shafts drivingly engaged to a common reduction gearbox (RGB) of the twin-engine system, the RGB configured to drive the rotary wing; and
    an accessory gearbox (AGB) drivingly connected to the electric engine, at least part of the AGB positioned at one end of the electric engine and the RGB positioned at another end of the electric engine.

11. The twin-engine system of claim 10, wherein the electric engine includes an electric generator configured to provide electrical power to the electric motor, the electric generator aligned with the electric motor within the twin-engine system.

12. The twin-engine system of claim 11, wherein the second output shaft of the electric motor extends through the electric generator.

13. The twin-engine system of claim 11, wherein the electric generator is drivingly engaged to the gas turbine engine.

14. A method of operating a twin-engine system drivingly coupled to a rotatable load, the method comprising:
    operating a gas turbine engine to drive a first output shaft;
    operating an electric motor to drive a second output shaft, having a first end and a second end extending from opposite ends of the electric motor;
    driving the rotatable load via a common reduction gearbox (RGB) to which the first and second output shafts are drivingly engaged, the RGB drivingly connected to the first end of the second output shaft; and
    driving an accessory gearbox (AGB) with the electric motor, the AGB drivingly connected to the second end of the second output shaft, the AGB and the RGB disposed at the opposite ends of the electric motor.

15. The method of claim 14, wherein operating the electric motor includes providing the electric motor with electrical power supplied by an electric generator.

16. The method of claim 15, wherein providing the electric motor with electrical power supplied by an electric generator includes driving the electric generator with the gas turbine engine.

17. The method of claim 14, wherein operating the electric motor includes supplying the electric motor with electrical power from a first battery, the method including providing the electric motor with electrical power from a second battery when the gas turbine engine is inoperable.

18. The method of claim 14, wherein driving the rotatable load via the common RGB includes driving the rotatable load with a rotatable input from one of the first and second output shafts.

* * * * *